E. B. COLEMAN.
WIND DEFLECTOR FOR AUTOMOBILES.
APPLICATION FILED NOV. 15, 1921.
1,433,260. Patented Oct. 24, 1922.
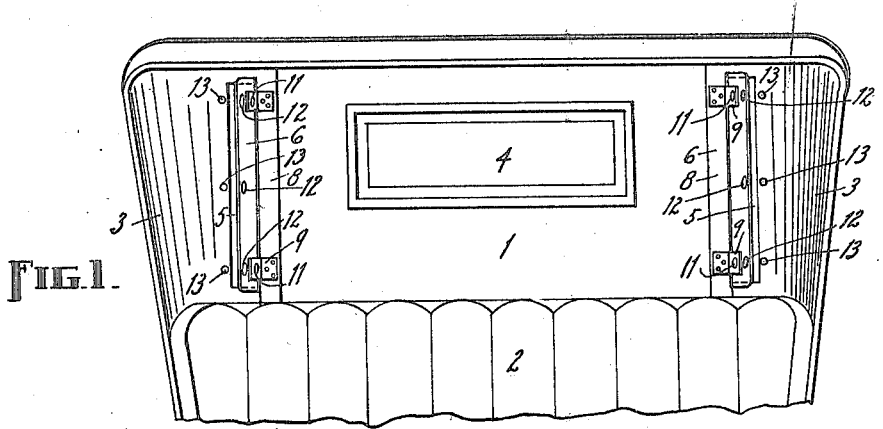
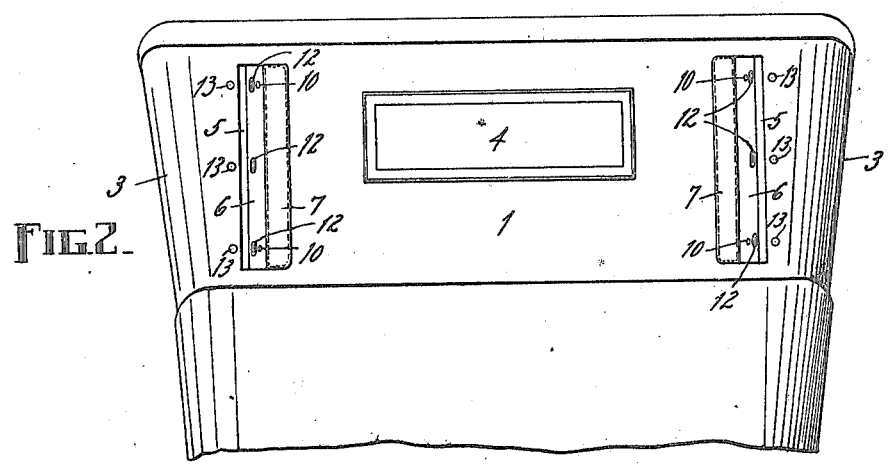
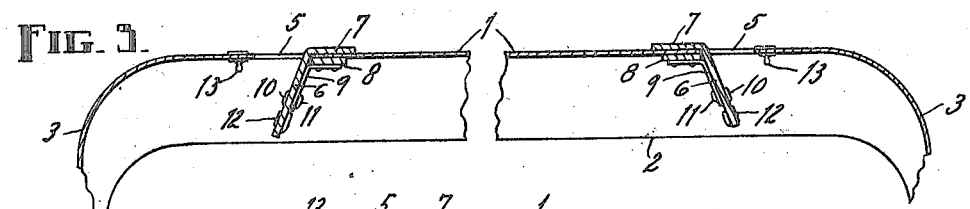
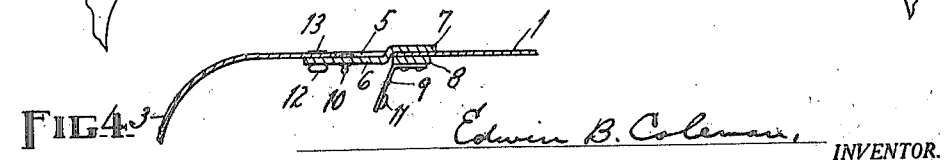
Edwin B. Coleman, INVENTOR.
BY
Frank A. Cutter, ATTORNEY.

Patented Oct. 24, 1922.

1,433,260

UNITED STATES PATENT OFFICE.

EDWIN B. COLEMAN, OF SPRINGFIELD, MASSACHUSETTS.

WIND DEFLECTOR FOR AUTOMOBILES.

Application filed November 15, 1921. Serial No. 515,188.

*To all whom it may concern:*

Be it known that I, EDWIN B. COLEMAN, a citizen of the United States of America, and a resident of Springfield, in the county of Hampden and State of Massachusetts, have invented a new and useful Wind Deflector for Automobiles, of which the following is a specification.

My invention relates to improvements in the construction of the backs of automobiles of the so-called open type, or to the portions of such backs that are above the rear seats, and resides in certain peculiar means with which the automobile back is provided, for deflecting the currents of air that impinge on said back when the automobile is in motion, such means comprising air-deflector fins, vanes, flaps, or wings attached to the back adjacent to air-exit openings which are made in said back, together with such other elements as may be necessary or desirable in order to render the deflector complete in every respect, all as hereinafter set forth.

Two wings and two slots are required for each automobile back that is equipped with my deflector, and these make up the deflector as a whole, aside from certain minor details that may be needed. The slot and wing, of what may be termed one-half of each deflector, are located in the automobile back adjacent to one end thereof from which one of the side pieces extends.

As is well known from experience by all who ride in roadsters, touring cars, and other automobiles of the open type, when the machine is in motion the air which enters between the forwardly-extending side members at the ends of the automobile back, under the automobile top, impinges on said back, is drawn or swept toward the vertical center of said back, and projected forward onto the person or persons riding on the rear seat, striking on the back of the head and neck. This occasions much discomfort to the occupant or occupants of the rear seat, and may produce undesirable physical effects. The primary object of my invention is, therefore, to protect the occupant or occupants of the rear seat of an open automobile, from the air currents or drafts to which reference has just been made, by deflecting such drafts from their natural courses and causing or permitting them to pass out through the back of the machine, thus preventing such currents or drafts from following along said back to the intermediate portion of the same, where they would be projected onto the head and neck as aforesaid.

Another object of my invention is to provide a wind deflector, of the character described, which is comparatively simple and inexpensive in construction, applicable to any make of automobile of the open type, and effectual and reliable in every respect.

A further object is to provide a wind deflector that can be closed, if desired, so as to render the back of the automobile practically as air tight as it would be without the deflector. This provision is desirable or necessary, if the automobile is to be enclosed with curtains to protect the occupants of the same from cold or inclement weather.

Other objects and advantages will appear in the course of the following description.

I attain the objects and secure the advantages of my invention, by the means illustrated in the accompanying drawings, in which—

Figure 1 is an inside elevation of an automobile back equipped with a deflector which embodies a practical form of my invention; Fig. 2, a rear elevation of the parts and members shown in the preceding view; Fig. 3, an enlarged, horizontal section through the automobile back and said deflector, looking down, the central portion of the back being broken out, and, Fig. 4, a similar section of a portion of said back and one-half of the deflector, showing the wing of the latter closed.

Similar reference characters designate similar parts throughout the several views.

In the drawings, an automobile back is represented at 1, and a portion of the back of the rear seat of the automobile at 2. The back 1 is of any usual construction, and at the ends thereof are the customary flaring, forwardly-extending side pieces 3—3. In the center of the back 1 is the usual window 4. Said back is either an extension from the element that forms the top of the automobile, or joins such element at the rear edge of the latter, and the necessary supporting bows and framework are employed. Although the shape and construction of automobile backs and connected and associated parts and members vary to a considerable extent in different makes of machines, similar characteristics exist so far as the back and side pieces at the ends of such backs are concerned, consequently my deflector is applicable in every case, although more or less change in its shape and size may and will be required in order to meet the different conditions due to the structural differences just referred to in the machines.

Passing now to the embodiment of my invention as illustrated in connection herewith, it will be observed that an opening or slot 5 is made in the back 1 adjacent to each side piece 3, and that a fin or wing 6 is attached to said back and positioned at an angle thereto and adjacent to the inner, vertical edge of said slot.

The slots 5 in the present example are long and narrow and arranged vertically in the back 1.

Each wing 6 is somewhat longer than the slot 5 with which it is associated, and said wing has at the rear edge a flap 7 that extends outwardly through said slot at the inner, longitudinal edge thereof, and is lapped onto the outer face of the back 1 and stitched or otherwise secured thereto. The wing 6 is also wider than its associated slot.

It is necessary that the wings 6 be positioned and held at an angle to the back 1, inside of the car of course, and to this end some means must be provided. It is desirable also that provision be made for closing the slots 5 with the wings 6. The present examples of both of these will now be described.

Secured by stitching or otherwise to the back 1, on the inside and adjacent to the inner, vertical edge of each slot 5, is a strip 8 of heavy leather or other suitable material. This strip may also be attached at the top to the rear bow, and attached at the bottom to the woodwork at the rear of the car, all depending on the construction of the car. Riveted or otherwise secured to each strip or support 8 are two angular brackets 9 arranged one above the other. The inwardly-extending arms of the brackets 9 are given an angle that corresponds with the angle at which it is desired to position the adjacent wing 6, so that when such wing is swung inwardly against said arms the former will occupy the correct angle relative to the back 1. Any suitable means may be provided for fastening the wings 6 to the brackets 9, such as ordinary male and female snap-fastener members indicated at 10 and 11, respectively. As herein illustrated, the wings 6, when fastened to the brackets 9, form slightly obtuse angles with that portion of the back 1 which is between the slots 5—see Figs. 1, 2, and 3. In some cases an angle at 90 degrees would be needed, and in other cases still different angles. The male members 10 are attached to the wings 6, and the female members to the free arms of the brackets 9.

In addition to the snap-fastener members 10, with which the wings 6 are provided, said wings are provided with the female elements 12 of other snap fasteners to engage a corresponding number of male elements 13 of such fasteners secured to the back 1 adjacent to the outer, vertical edges of the slots 5. Upon releasing the wings 6 from the brackets 9, said wings can be swung rearwardly or outwardly over the slots 5 and secured in such position, by means of the snap-fastener members 12 and 13, as shown in Fig. 4. Ordinarily the wings are in what may be termed their operative positions, which are the positions they occupy when fastened to the brackets 9, it only being upon occasions when all of the curtains of the automobile are in place that said wings are caused to assume their closed positions over the slots 5.

It will now be seen that, when the wings 6 are in their normal or operative positions, with the slots 5 open, the air currents, which rush in between the side pieces 3 and onto the back 1, impinge on the wings 6, and are deflected by said wings and caused to pass out through the slots 5. The air between the wings 6 is inactive in consequence of the barriers afforded by the wings and the relief afforded by the slots, and there is no draft produced at any point to be projected onto the person or persons on the back seat. In the absence of the projecting wings and the slots, the aforesaid air currents would sweep on, guided by the back 1, to meet and be projected forward, to the discomfort and danger of the person or persons subjected to their action. When the automobile is entirely enclosed with curtains, drafts in the back part of the machine are eliminated, and it is then desirable to close the slots 5 with the wings 6, so that the entrance is prevented of the elements through said slots.

The positions of the wings 6 can be readily and expeditiously changed in the present construction, since it is necessary merely to detach the snap-fastener members 10 from the snap-fastener members 11, of which members there are four sets, and attach or connect the snap-fastener members 12 with the snap-fastener members 13, of which members 12 and 13 there are six sets, after swinging the wings 6 over the openings 5.

on the one hand; and to disengage said members 12 from said members 13, swing said wings into contact with the brackets 9, and reengage said members 10 with said members 11, on the other hand.

As has already been pointed out or intimated, various changes are required in the shape, size, construction, and arrangement of some or all of the parts of the deflector in order to render the same applicable to different makes of automobiles, wherefore I do not desire or intend to be restricted in such matters to the exact construction herein shown and described, but seek to cover broadly the combinations of parts and members entering into the general construction of the deflector, and all mechanical equivalents thereof, provided the same do not depart from the spirit of my invention, and fall within the scope of what is claimed.

What I claim as my invention, and desire to secure by Letters Patent, is—

1. A wind deflector for automobiles, comprising an automobile back having openings therein, and means adjacent to the adjacent vertical edges of said openings to deflect air currents impinging on said back beyond said openings, and cause such currents to pass outwardly through said openings.

2. A wind deflector for automobiles, comprising an automobile back having openings therein, and means adjacent to the adjacent vertical edges of said openings to deflect air currents impinging on said back beyond said openings, and cause such currents to pass outwardly through said openings, said means being movable to close said openings.

3. The combination, in a wind deflector for automobiles, with an automobile back having an opening therein, of a member supported at one vertical edge and projecting inwardly from said back adjacent to the inner edge of said opening.

4. The combination, in a wind deflector for automobiles, with an automobile back having an opening therein, of an approximately vertical member projecting inwardly from said back adjacent to the inner edge of said opening, means to support said member in such position, and means for attaching said member to and detaching the same from said first-named means.

5. The combination, in a wind deflector for automobiles, with an automobile back having an opening therein, of an approximately vertical member adapted to project inwardly from said back adjacent to the inner edge of said opening, and to be actuated into position to close said opening.

6. The combination, in a wind deflector for automobiles, with an automobile back having an opening therein, of an approximately vertical member adapted to project inwardly from said back adjacent to the inner edge of said opening, and to be actuated into position to close the same, and means to secure said member in said last-named position.

7. The combination, in a wind deflector for automobiles, with an automobile back having an opening therein, of an approximately vertical member adapted to project inwardly from said back adjacent to the inner edge of said opening, and to be actuated into position to close the same, and means to secure said member in either of said positions.

8. The combination, in a wind deflector for automobiles, with an automobile back and side pieces, said back having openings therein adjacent to said side pieces, of approximately vertical members projecting inwardly from said back adjacent to the inner edges of said openings, other members projecting from said back to afford positioning means for said first-named members, and means to secure said first-named to said second-named members.

9. The combination, in a wind deflector for automobiles, with an automobile back and side pieces, said back having openings therein adjacent to said side pieces, of members projecting inwardly from said back adjacent to the inner edges of said openings, other members projecting from said back and adapted to afford positioning means for said first-named members, and means detachably to secure said first-named to said second-named members.

10. The combination, in a wind deflector for automobiles, with an automobile back and side pieces, said back having openings therein adjacent to said side pieces, of approximately vertical members projecting inwardly from said back adjacent to the inner edges of said openings, other members projecting inwardly from said back to afford positioning means for said first-named members, and detachable means to fasten said first-named to said second-named members, said first-named members being adapted to be swung over said openings.

11. The combination, in a wind deflector for automobiles, with an automobile back and side pieces, said back having openings therein adjacent to said side pieces, of members projecting inwardly from said back adjacent to the inner edges of said openings, other members projecting inwardly from said back to afford positioning means for said first-named members, detachable means to fasten said first-named to said second-named members, said first-named members being adapted to be swung over said openings, and detachable means to fasten said first-named members in said last-named position.

12. The combination, in a wind deflector for automobiles, with an automobile back having openings therein, and provided with supports adjacent to the inner edges of said openings, and brackets secured to said supports, of approximately vertical wings secured to said back at points also adjacent to said inner edges of said openings, and adapted to be positioned in an inwardly-extending direction by said brackets.

13. The combination, in a wind deflector for automobiles, with an automobile back having openings therein, of approximately vertical wings having flaps extending through said openings at their inner edges and secured to said back on the rear face thereof, and means to position said wings at an angle relative to said back.

EDWIN B. COLEMAN.

Witnesses:
F. A. CUTTER,
H. H. CUTTER.